United States Patent
Frank

(10) Patent No.: US 9,840,327 B1
(45) Date of Patent: Dec. 12, 2017

(54) VERTICAL TAKEOFF AND LANDING (VTOL) AIRCRAFT AND SYSTEM

(71) Applicant: RFRANK LLC, New Berlin, WI (US)

(72) Inventor: Roger S. Frank, New Berlin, WI (US)

(*) Notice: Subject to any disclaimer, the term of this patent is extended or adjusted under 35 U.S.C. 154(b) by 0 days.

(21) Appl. No.: 15/340,585

(22) Filed: Nov. 1, 2016

Related U.S. Application Data

(60) Provisional application No. 62/329,454, filed on Apr. 29, 2016.

(51) Int. Cl.
| | |
|---|---|
| *B64C 29/00* | (2006.01) |
| *B64C 39/02* | (2006.01) |
| *B64D 27/24* | (2006.01) |
| *B64D 37/04* | (2006.01) |
| *B64C 25/32* | (2006.01) |
| *B64D 9/00* | (2006.01) |
| *B64D 11/00* | (2006.01) |
| *B64C 1/06* | (2006.01) |

(52) U.S. Cl.
CPC .............. *B64C 39/02* (2013.01); *B64C 1/068* (2013.01); *B64C 25/32* (2013.01); *B64C 29/00* (2013.01); *B64D 9/00* (2013.01); *B64D 11/00* (2013.01); *B64D 27/24* (2013.01); *B64D 37/04* (2013.01); *B64D 2011/0069* (2013.01)

(58) Field of Classification Search
CPC ..... B64C 29/00; B64C 29/02; B64C 29/0091; B64D 37/04
See application file for complete search history.

(56) References Cited

U.S. PATENT DOCUMENTS

| | | | |
|---|---|---|---|
| 1,892,036 A | 12/1932 | Remy | |
| 2,448,862 A | 9/1948 | Conklin | |
| 2,577,287 A | 12/1951 | Sullivan | |
| D171,509 S | 2/1954 | Lightbourn | |
| 3,361,396 A | 1/1968 | Reno | |
| 3,605,935 A | 9/1971 | Gilbert | |
| 4,163,535 A | 8/1979 | Austin | |
| D292,194 S | 10/1987 | Moller | |
| 5,842,667 A | 12/1998 | Jones | |
| 6,883,748 B2 | 4/2005 | Yoeli | |
| 7,086,677 B2 | 8/2006 | Bae et al. | |
| 7,472,862 B2* | 1/2009 | Blevio, Sr. | B64C 25/32 244/49 |
| 7,959,104 B2 | 6/2011 | Kuntz | |
| 8,328,130 B2* | 12/2012 | Goossen | B64C 27/20 244/17.11 |
| 8,453,962 B2 | 6/2013 | Shaw | |
| 8,646,720 B2 | 2/2014 | Shaw | |
| 8,876,057 B2 | 11/2014 | Alber et al. | |
| 9,022,312 B2* | 5/2015 | Kosheleff | B64F 1/007 244/12.1 |

(Continued)

*Primary Examiner* — Christopher P Ellis
(74) *Attorney, Agent, or Firm* — Husch Blackwell LLP

(57) ABSTRACT

A VTOL aircraft system includes a first unit having a cockpit, at least one propeller, at least two landing legs and at least two locking mechanisms. A second unit has a housing with a base portion, a first unit engaging portion, and at least two lock mechanism-engaging structure, each corresponding to one of the at least two locking mechanisms of the first unit. The housing of the second unit defines at least one interior cavity with at least one cargo area, a central passage providing access between the first and second unit, and a fuel cell configured around the central passage.

23 Claims, 16 Drawing Sheets

(56) References Cited

U.S. PATENT DOCUMENTS

| | | | |
|---|---|---|---|
| 9,051,050 B2 | 6/2015 | Achtelik et al. | |
| 9,108,728 B2 | 8/2015 | Shaw | |
| 9,440,736 B2 * | 9/2016 | Bitar | B64C 27/12 |
| 2005/0205715 A1 * | 9/2005 | Hansen | B64C 27/20 |
| | | | 244/12.1 |
| 2007/0228214 A1 * | 10/2007 | Horak | A63H 27/14 |
| | | | 244/63 |
| 2009/0008499 A1 * | 1/2009 | Shaw | B64C 27/20 |
| | | | 244/17.23 |
| 2009/0084890 A1 * | 4/2009 | Reinhardt | B64C 29/0033 |
| | | | 244/12.4 |
| 2009/0224095 A1 * | 9/2009 | Cox | B64C 27/20 |
| | | | 244/17.23 |
| 2010/0147993 A1 * | 6/2010 | Annati | B64C 27/20 |
| | | | 244/12.2 |
| 2011/0042510 A1 * | 2/2011 | Bevirt | B64C 29/0033 |
| | | | 244/12.4 |
| 2013/0020429 A1 * | 1/2013 | Kroo | B64C 3/16 |
| | | | 244/6 |
| 2013/0082139 A1 | 4/2013 | Agajanian | |
| 2013/0251525 A1 * | 9/2013 | Saiz | B64C 27/26 |
| | | | 416/23 |
| 2014/0236390 A1 * | 8/2014 | Mohamadi | B64C 19/00 |
| | | | 701/2 |
| 2017/0197710 A1 * | 7/2017 | Ma | B64C 29/0016 |
| 2017/0217323 A1 * | 8/2017 | Antonini | B60L 11/1816 |

* cited by examiner

SECTION "C"-"C"

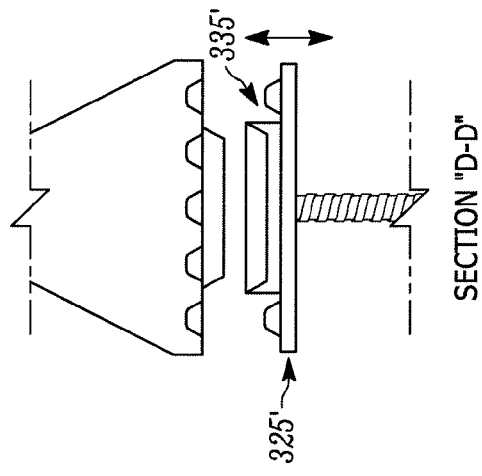
FIG. 18A
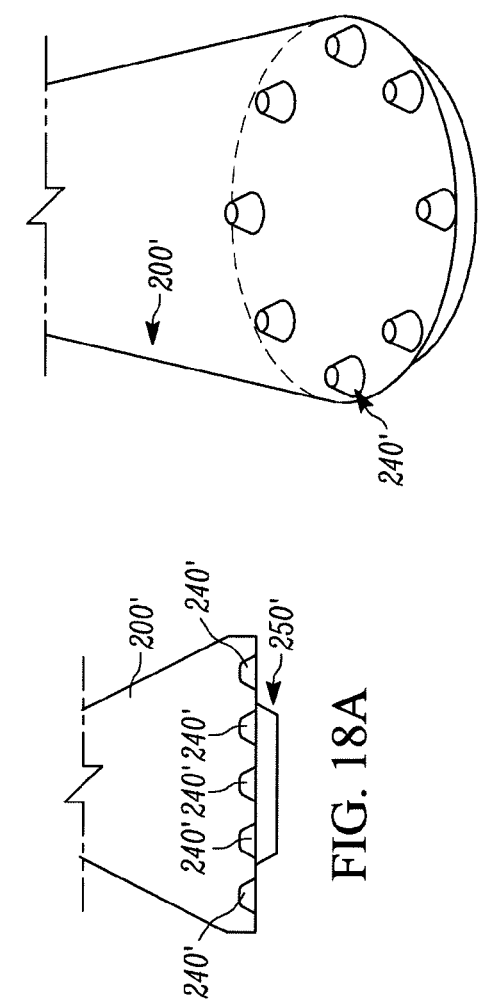
FIG. 18B
FIG. 18C
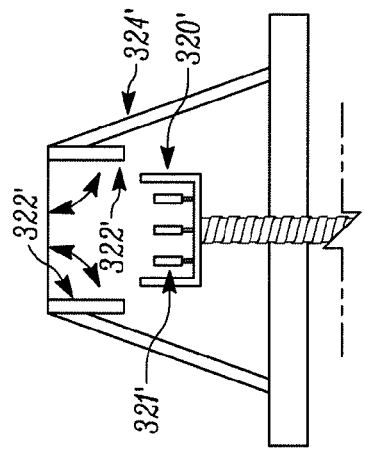
SECTION "D-D"
FIG. 18D
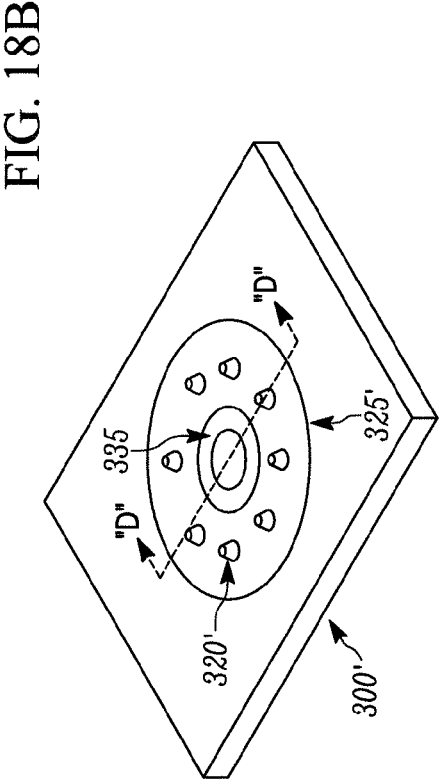
FIG. 18E

VERTICAL TAKEOFF AND LANDING (VTOL) AIRCRAFT AND SYSTEM

FIELD OF THE INVENTION

The present invention relates, generally, to the field of vertical takeoff and landing aircrafts. More particularly, the present invention relates to vertical takeoff and landing aircrafts and systems with a modular design having a first unit including steering and piloting capabilities and a second unit including the fuel and cargo and/or passengers.

BACKGROUND OF THE INVENTION

Vertical takeoff and landing (VTOL) aircrafts are useful for transporting people and/or cargo. VTOL aircrafts may be particularly useful as alternatives to airplanes and/or helicopters, for example, in areas with little room for a runway or helicopter pad (e.g., urban areas) or for transferring people and/or cargo shorter distances than would be economically feasible using an airplane or helicopter.

One disadvantage with VTOL aircrafts, and, indeed, aircrafts in general, is the time required between trips to refuel, unload, and/or reload the aircraft.

For at least these reasons, therefore, it would be advantageous if a new or improved VTOL aircraft could be developed that addressed one or more of the above-described concerns, and/or other concerns.

SUMMARY OF THE INVENTION

In accordance with one embodiment, disclosed herein is a vertical takeoff and landing (VTOL) aircraft.

In accordance with a further embodiment, disclosed herein is a VTOL aircraft comprising a first unit comprising a cockpit, at least one propeller, at least two landing legs and at least two locking mechanisms; and a second unit having a housing with a base portion, a first unit engaging portion, and at least two lock mechanism-engaging structures, each corresponding to one of the at least two locking mechanisms of the first unit, the housing defining at least one interior cavity comprising at least one cargo area, a central passage providing access between the first unit and second unit, and a fuel cell configured around the central passage. In accordance some embodiments, the fuel cell is selected from the group consisting of a fuel tank configured to hold liquid fuel, a rechargeable battery, and combinations thereof.

In accordance with a further embodiment, disclosed herein is a VTOL aircraft system.

In accordance with a further embodiment, disclosed herein is a VTOL aircraft system comprising a first unit comprising a cockpit, at least one propeller, at least two landing legs and at least two locking mechanisms; and a second unit having a housing with a base portion, a first unit engaging portion, and at least two lock mechanism-engaging structure, each corresponding to one of the at least two locking mechanisms of the first unit, the housing defining at least one interior cavity comprising at least one cargo area, a central passage providing access between the first and second unit, and a fuel cell configured around the central passage.

In accordance with a further embodiment, disclosed herein is a vertical takeoff and landing aircraft system comprising: a first unit comprising a cockpit, a plurality of propellers configured around the cockpit, at least two landing legs, and at least two locking mechanisms; at least two second units, each having a housing with a base portion, a first unit engaging portion, and at least two lock mechanisms-engaging structures, each corresponding to one of the at least two locking mechanisms of the first unit, the housing defining at least one interior cavity comprising at least one cargo area, a central passage providing access between the first and second unit, and a fuel cell configured around the central passage, wherein the base has a width greater than the first unit engaging portion and comprises a male step portion having a plurality of recharging/refueling receivers, wherein the first unit and second unit are releasably and interoperably connectable such that fuel from the fuel cell provides power to the propellers, and at least two recharging/refueling pads, each pad having a female recessed area corresponding to the male step portion of the second units, the female recessed area comprising a plurality of recharging/refueling heads, each corresponding to one of the plurality of recharging/refueling receivers on the male step portion of the second units.

In accordance with a further embodiment, disclosed herein is a cargo unit for a VTOL aircraft.

In accordance with a further embodiment, disclosed herein is a cargo unit for a VTOL aircraft, the cargo unit comprising a housing defining at least one interior cavity comprising at least one cargo area, a central passage, and a fuel cell configured around the central passage, and at least two lock mechanism-engaging structures configured to engage locking mechanisms on the VTOL aircraft, wherein the fuel cell is selected from the group consisting of a fuel tank configured to hold liquid fuel, a rechargeable battery, and combinations thereof.

BRIEF DESCRIPTION OF THE DRAWINGS

Features of the present disclosure which are believed to be novel are set forth with particularity in the appended claims. Embodiments of the disclosure are disclosed with reference to the accompanying drawings and are for illustrative purposes only. The disclosure is not limited in its application to the details of construction or the arrangement of the components illustrated in the drawings. The disclosure encompasses other embodiments and is capable of being practiced or carried out in other various ways. The drawings illustrate a best mode presently contemplated for carrying out the invention. Like reference numerals are used to indicate like components. In the drawings:

FIGS. 18A-18E illustrate an alternative configuration of recharging/refueling heads on a recharging/refueling pad and receivers on a second unit of a VTOL aircraft in accordance with embodiments of the present disclosure.

DETAILED DESCRIPTION

In accordance with one embodiment, a vertical takeoff and landing (VTOL) aircraft system is disclosed having three main components—a first (upper) unit 100 of a VTOL aircraft which is used to pilot the aircraft, a second (lower) unit 200 of a VTOL aircraft which provides fuel/power to the upper unit 100 and also serves as a vessel for carrying people, cargo and/or other items intended for the ultimate use of the pod, and a recharging/refueling pad 300. Although the first unit 100 is configured as a VTOL aircraft on its own, together the first and second units 100, 200 form an embodiment of a VTOL aircraft including cargo space/capability as described below. Each component is now described in further detail below.

Figure 1A:
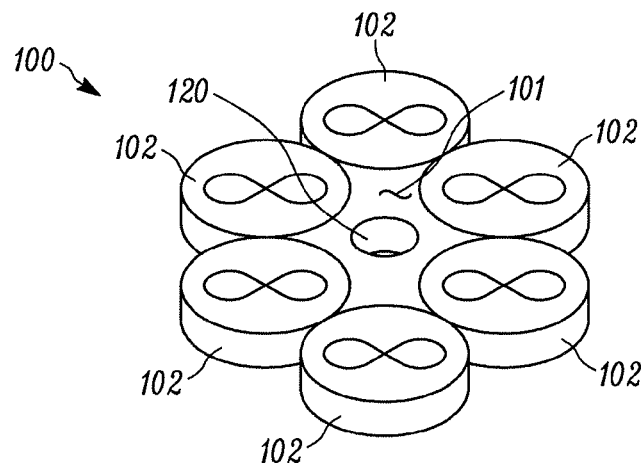
FIGS. 1A-1C are schematic representations of first units for a VTOL aircraft in accordance with embodiments of the present disclosure.
Figure 1B:
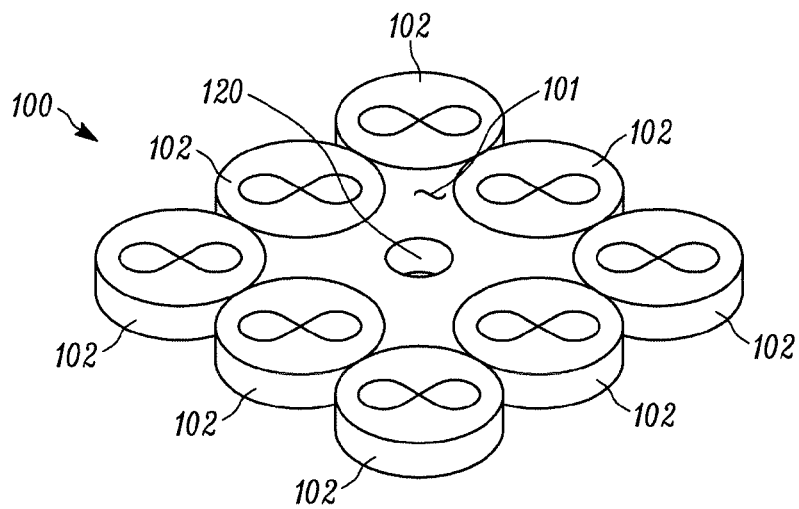
Figure 1C:
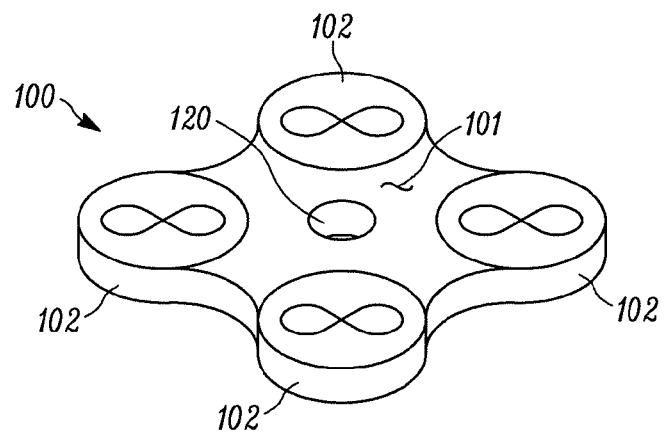

In accordance with embodiments of the present disclosure, FIGS. 1A-1C are schematic representations of different embodiments of a first, or upper unit 100 of a vertical takeoff and landing (VTOL) aircraft. Each of the embodiments shown in FIGS. 1A-1C includes at least one propeller 102, and preferably a plurality of propellers 102, configured around a central cockpit 120. A first embodiment, as shown in FIG. 1A, shows six propellers 102. A second embodiment, as shown in FIG. 1B, shows eight propellers 102. A third embodiment, as shown in FIG. 1C, shows four propellers 102. In still further embodiments, the upper unit 100 may have a configuration similar to a helicopter, with a single propeller over a cockpit area and optional propellers on a tail area. In other words, while in the embodiments shown in FIGS. 1A-1C the propellers 102 are shown disposed around a central cockpit and generally in a horizontal plane with the cockpit 120, in further embodiments, one or more propellers 102 may be positioned at a vertical distance from the cockpit 120.

The number, positioning and/or configuration of propellers 102 for a given upper unit 100 of a VTOL aircraft may vary depending on the size and/or use of the VTOL aircraft, and the number, positioning and/or configuration of propellers 102 may be determined according to standards/requirements known in the art.

In an embodiment, the propellers 102 are configured to be easily removed and replaced with identical or different types of propellers. In an embodiment, propellers 102 may rotate in the same or different directions, depending on the particular application of the VTOL aircraft and/or the number, positioning and/or configuration of the propellers 102.

In a further embodiment, the propellers 102 may be positioned generally within a horizontal plane relative to the upper unit 100 when the upper unit 100 is in standard operating position. In another embodiment, the propellers 102 may be configured to tilt slightly relative to a generally horizontal plane relative to the upper unit 100 when in standard operating position. In still further embodiments, one or more propellers 102 may be positioned generally within a vertical plane relative to the upper unit 100 when the upper unit 100 is in standard operating position. In another embodiment, one or more propellers 102 may be configured to tilt slightly relative to a generally vertical plane relative to the upper unit 100 when in standard operating position. The positioning and relative angle of one or more propellers 102 may be determined by such variables as are known in the art to effect such propeller 102 positioning, including, but not limited to, the application of the VTOL aircraft and/or the number, positioning, and/or configuration of propellers 102.

In an embodiment, the propellers 102 are positioned such that the cockpit 120 has 360° visibility.

In an embodiment, such as shown in FIGS. 1A-1C, the upper surface 101 of the upper unit is void of doors, hatches or other compartment openings so that the upper surface 101 is sealed from the environment. In such embodiments, when the upper surface 101 is void of doors, etc., pilots enter the cockpit 120 through a passage 220a in the bottom of the cockpit, as shown in FIG. 2.

Figure 2:
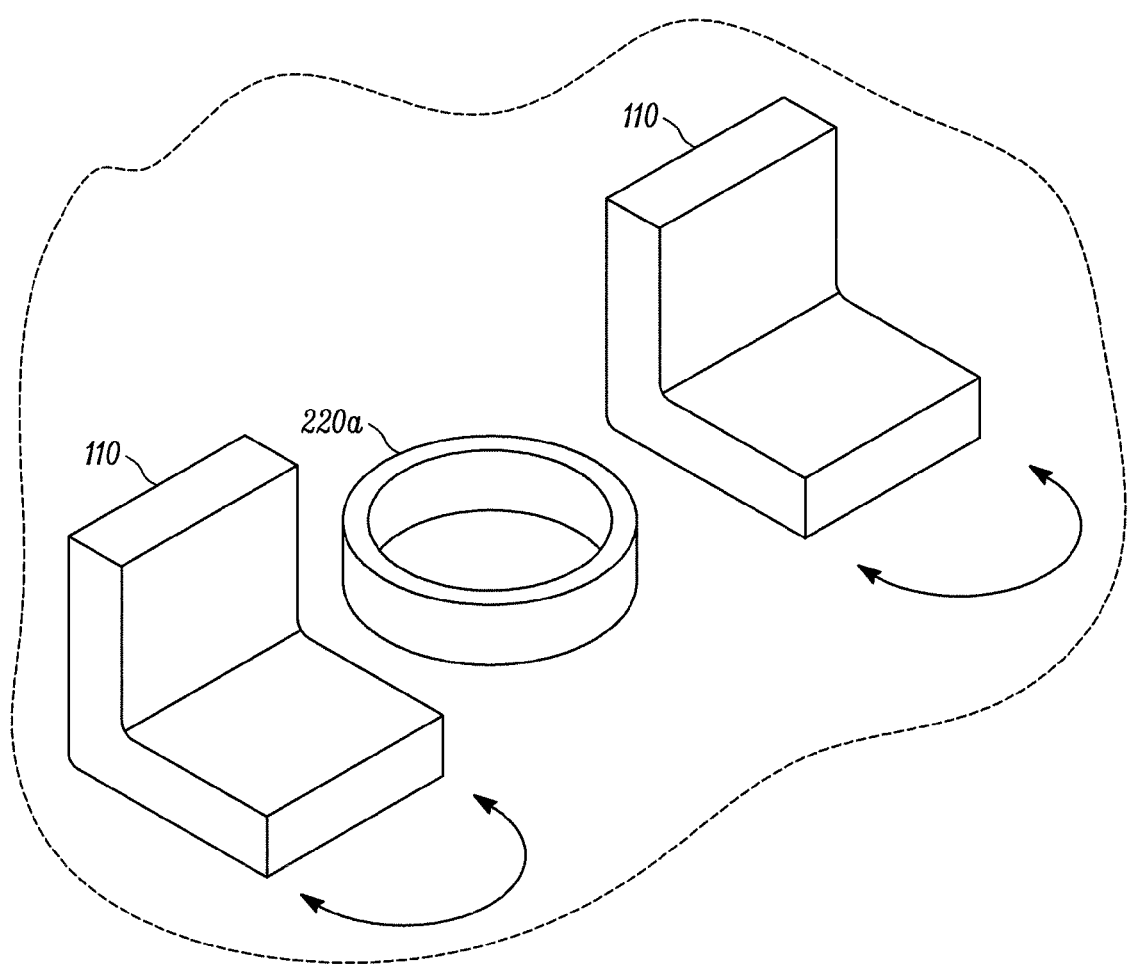
FIG. 2 shows an interior of an exemplary cockpit for a VTOL aircraft in accordance with embodiments of the present disclosure.

FIG. 2 shows the interior space of a cockpit according to an exemplary embodiment in further detail. As shown in further detail with respect to FIGS. 3A-6, passage 220a permits access to the cockpit 120 from the second unit 200 so that no doors/hatches are disposed on the upper surface 101 of the upper unit 100. The seats 110 of the cockpit are designed to swivel or pivot in order to (1) facilitate access to the cockpit through passage 220a and (2) improve visibility. In one embodiment, for example, the seats 110 pivot 360°.

In addition to the structures/components described above, the upper unit 100 also contains the necessary structures/components which enable the VTOL aircraft to fly and perform other necessary and traditional aircraft tasks (e.g., computer systems, navigation systems, communications systems, autopilot, lighting, steering, gauges, altitude/speed/heading sensors and displays, etc.). Further, as will be described with further detail later, the upper unit 100 also contains components which allow it to connect and secure to a second unit 200 and engage a power or fuel supply on the second unit 200 to power the propellers 201.

In order to remain operative when transferring between second, or lower units 200, as described in further detail below, the upper unit 100 also includes its own power supply which is capable of providing sufficient power to the upper unit 100 to enable it to, in addition to performing necessary and traditional aircraft tasks when not engaged with a lower unit 200, release a first lower unit 200, move to a second lower unit 200, and engage the second lower unit 200 in order to begin using the power or fuel from the second lower unit 200. In an embodiment, the power supply of the upper unit 100 may include, for example, but is not limited to, a self-contained power or fuel supply (e.g., battery, refillable storage take), a rechargeable generator (rechargeable using power/fuel from the lower unit 200 being released or from power generated during flight), or other rechargeable power supply. In an embodiment, the power supply is isolated to the first unit 100.

In an embodiment, the power supply may be centrally located within the upper unit 100, such as, for example, under the seats 110 and/or around the passage 220a. In other embodiments, the power supply may be positioned such that the weight of the power supply is evenly distributed in the upper unit 100, such as, for example, radially around the passage 220a and/or positioned along an outer perimeter of the upper unit 100 or cockpit 120. In further example, the power supply may be positioned radially outward from and circumferentially around the passage 220a.

FIGS. 3A-3B, 4A-4B and 5A-5B illustrate exemplary second units 200 useful in the present disclosure. Specifically, FIGS. 3A-3B, 4A-4B and 5A-5B each show a different type or configuration of lower unit 200, and particularly the cargo area 207 of the lower unit 200, with each of the three lower units 200 having several common features. First, lower units 200 each include a housing 208 defining one or more interior cavities 209. In an interior cavity 209 of each of the lower units 200 is a passage 220b which corresponds to the passage 220a in the upper unit 100. The pilot(s)/copilot(s) enter the lower units 200 through door 230 (see FIG. 6) and proceed up through channels 220a/220b to access the cockpit 120.

Each lower unit 200 also includes a fuel cell 210 contained within the interior cavity 209 to fuel the upper unit 100. In an embodiment, the fuel cell 210 may be in the form of a cavity, or multiple cavities, configured to hold liquid fuel (e.g., fuel tank). In another embodiment, the fuel cell 210 may be in the form of one or more rechargeable batteries, such as lithium ion batteries. In a further embodiment, the fuel cell 210 may be a combination of one or more fuel tanks configured to hold liquid fuel and one or more rechargeable batteries, resulting in a "hybrid" power system for the VTOL aircraft.

In an embodiment, the fuel cell 210 is selected from the group consisting of a fuel tank configured to hold liquid fuel, a rechargeable battery, and combinations thereof.

In the embodiments shown, the passage 220b is centrally located in the interior cavity 209, extending from the floor or lower surface of the cavity 209 through the upper surface to open to the passage 220a of the upper unit 100. The fuel cell 210 is positioned radially outward from and circumferentially around the passage 220b. Similarly, the cargo space 207, described in further detail below, is positioned radially outward from and circumferentially around the channel 220b and fuel cell 210. This radial/circumferential configuration facilitates even weight distribution in the lower unit 200.

In some embodiments, the passage 220b may not be centrally located. For example, in some instances, it may be desirable to have exterior access to an upper unit 100, in which case a lower unit 200 would not include a passage 220b, or it may be desirable to move the passage 220b to the perimeter of the lower unit 200. In such instances, the fuel cell 210 would be centrally located to form a "core" of the lower unit 200. Keeping the fuel cell 210 in the center of the lower unit 200 facilitates balance of the lower unit 200 for in flight.

While in the exemplary embodiments shown, the housing 208 has a cone-like shape, it will be understood that the lower unit 200 may take any shape, including cylindrical, cubical, cuboidal, conical, prism-shaped, hemispherical, pyramidal, or tetrahedron-shaped. In each instance, however, the fuel cell 210 is always centrally located and positioned radially from the passage 220b, if present. In some embodiments, the fuel cell 210 may have a shape which at least partially conforms to the shape of the housing 208.

In further embodiments, the lower units 200 may further include an auxiliary or backup power source. An auxiliary power source may provide power while the main fuel cell is recharging/refueling or serve as a backup power supply for critical systems in the event of an emergency.

Figure 6:
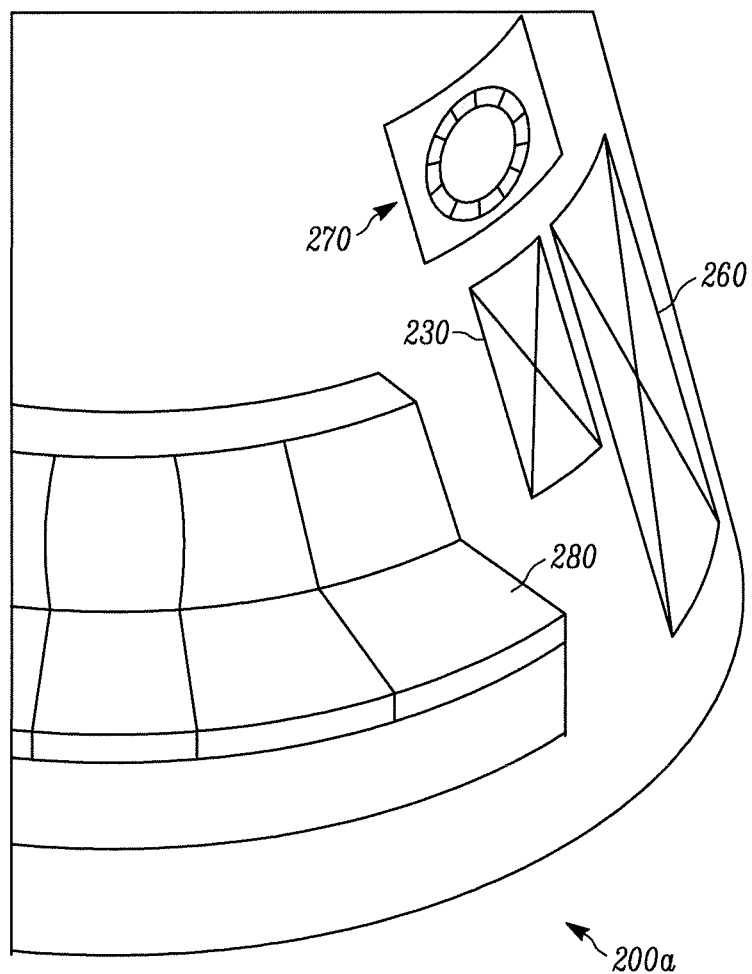
FIG. 6 illustrates an exemplary entryway for a second unit for a VTOL aircraft in accordance with embodiments of the present disclosure.

With reference to FIG. 6, depending on the use of the lower unit 200, the lower unit 200 may also include a common outer door 260 to be used by passengers to access the interior of the lower unit 200. It will be understood that the pilot(s)/copilot(s) will also need to use door 260 in order to reach door 230 in some embodiments, such as, for example, with respect to lower unit 200a. However, door 230, in some embodiments, is configured as a cockpit door, including the necessary locks and security structures to prevent unauthorized access of the cockpit during flight. The outer door 260, in most embodiments, does not include such locks and security structures. In embodiments, the outer door 260 is locked similarly to standard aircraft doors, such as those on airplanes and/or helicopters.

In the embodiments shown, the interior cavity(ies) 209 also include at least one cargo space 207. As used herein, the term "cargo" means any object or item, inanimate or alive, which is intended to be transported by a lower unit 200, exclusive of any object, items, mechanisms, structures or devices necessary or desirable for the operation of the lower unit 200 (e.g., those items installed on, and therefore part of, the lower unit 200), VTOL aircraft or VTOL aircraft system as disclosed herein. For example, in an embodiment, cargo includes people (passengers), animals, articles and combinations thereof.

Figure 3A:
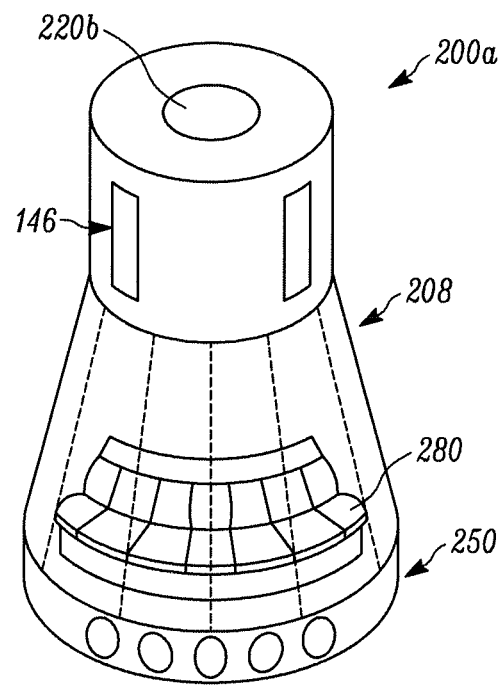
FIGS. 3A-3B illustrate an exemplary second unit for a VTOL aircraft in accordance with embodiments of the present disclosure.
Figure 3B:
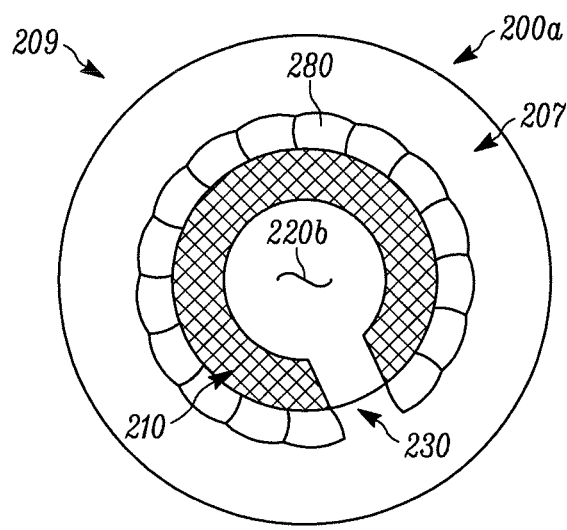
Figure 4A:
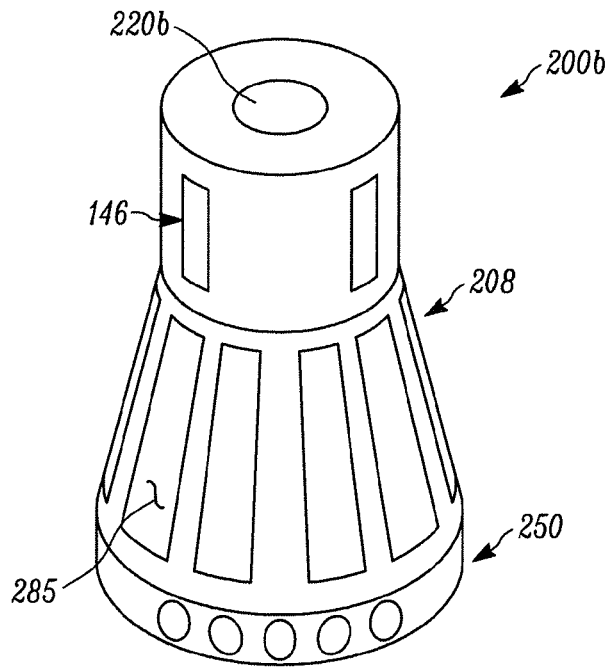
FIGS. 4A-4B illustrate an alternative second unit for a VTOL aircraft in accordance with embodiments of the present disclosure.
Figure 4B:
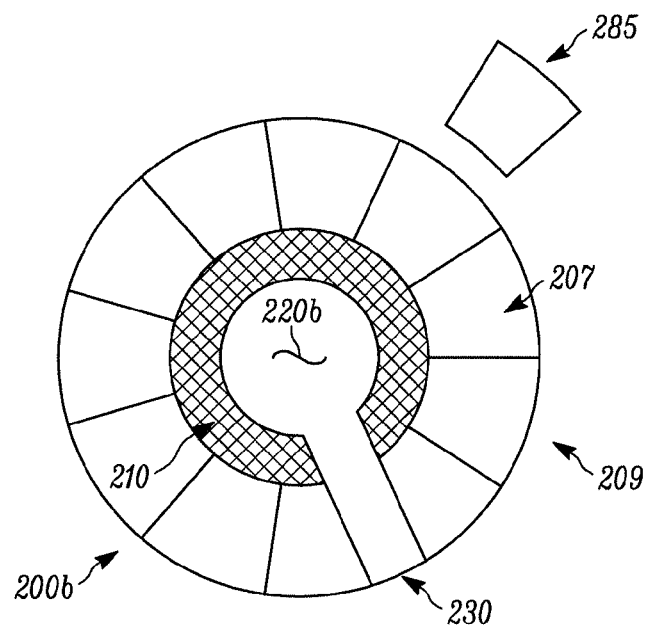
Figure 5A:
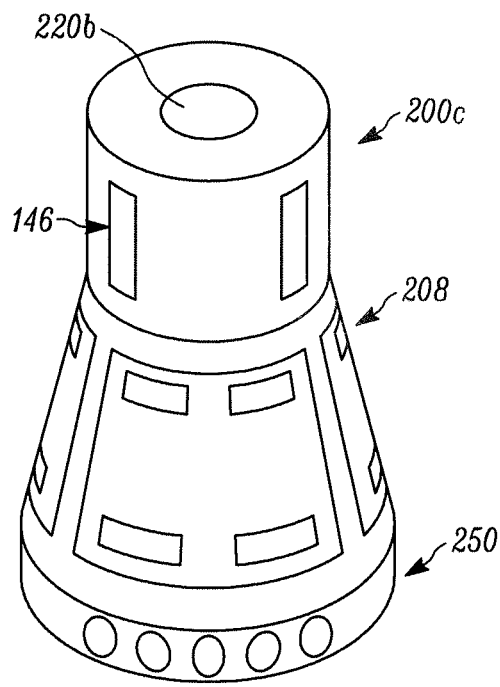
FIGS. 5A-5B illustrate a further alternative second unit for a VTOL aircraft in accordance with embodiments of the present disclosure.
Figure 5B:
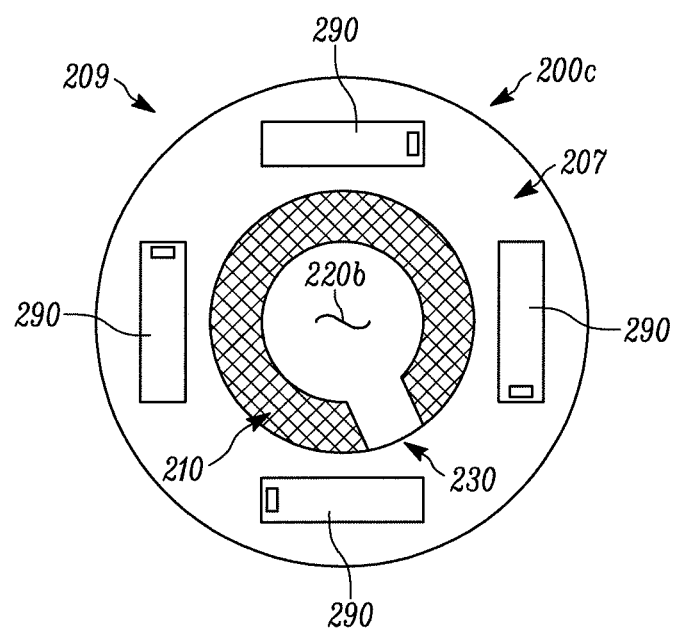

In the embodiments shown in FIGS. 3A-3B and 6, lower unit 200a is configured for use as a passenger pod to carry people (e.g, cargo area 207 designed to hold passengers). Seating 280 is provided circumferentially around the passage 220b and fuel cell 210. In some embodiments, the seats 280 may be numbered and passengers receive a seating assignment on their ticket and/or via a display board 270 at the entry door 260. In an embodiment, seating assignments may be made so as to balance the total load around the lower unit 200a.

Lower unit 200b is configured for use as a cargo pod designed to carry items other than people (e.g., cargo area 207 designed to carry articles). In the embodiment shown, the cargo area 207 is segmented into a plurality of modular cargo boxes 285 are provided around the fuel cell 210 and central passage 220b. In the embodiment shown, the cargo boxes 285 accessible from the outside of the lower unit 200b, which minimizes access to the lower unit 200b interior and, therefore, cockpit 120. Having cargo boxes 285 also assists in balancing loads around the lower unit 200b. For example, each box 285 may be filled to an approximate pre-determined weight in order to ensure the total load is distributed in an even manner around the lower unit 200b. In further embodiments, lower unit 200b may have hollow storage areas with doors and without boxes 285. In still further embodiments, the cargo may be loaded into the lower unit 200*b* from the inside.

Lower unit 200*c* is shown configured as an exemplary rescue pod for retrieving people from remote and/or hostile locations (e.g., cargo area 207 designed to carry people and rescue supplies). In the exemplary embodiment shown, lower unit 200*c* is configured with a number of sleeping quarters/beds 290 arranged around the central passage 220*b* and fuel cell 210. In further embodiments, lower unit 200*c* may further include pre-packaged rations, first aid supplies, and/or other items specifically tailored to the environment in which the lower unit 200*c* will be deployed. In an embodiment, the cargo area contains at least one item selected from the group consisting of a sleeping quarter/bed, medical supplies, food rations, and combinations thereof. Lower units 200*c* may be useful, for example, in military, coast-guard and ski patrol applications. Lower units 200*c* may also be useful during, for example, natural disasters, military raids/invasions, and/or rescue missions to areas of difficult/low access.

In an embodiment, the cargo area 207 is configured to transport an item selected from the group consisting of passengers, articles, sleeping quarters/beds, medical supplies, food rations, and combinations thereof.

In the embodiments shown, the housing 208 of the lower units 200 are shown to be conical in shape, having a wide base which tapers upward to a narrowed portion which engages the upper unit 100 (e.g., "first unit engaging portion"). In other words, the base portion has a width greater than that of the first unit engaging portion. The lower units 200 also include a male step portion 250 at the bottom of the base which facilitates recharging/refueling, as described in further detail below. In further embodiments, the lower units 200 may be rounded or another shape so long as configured, such as, for example, described below, to engage an upper unit 100, and preferably, also a recharging/refueling pad 300.

Figure 7:
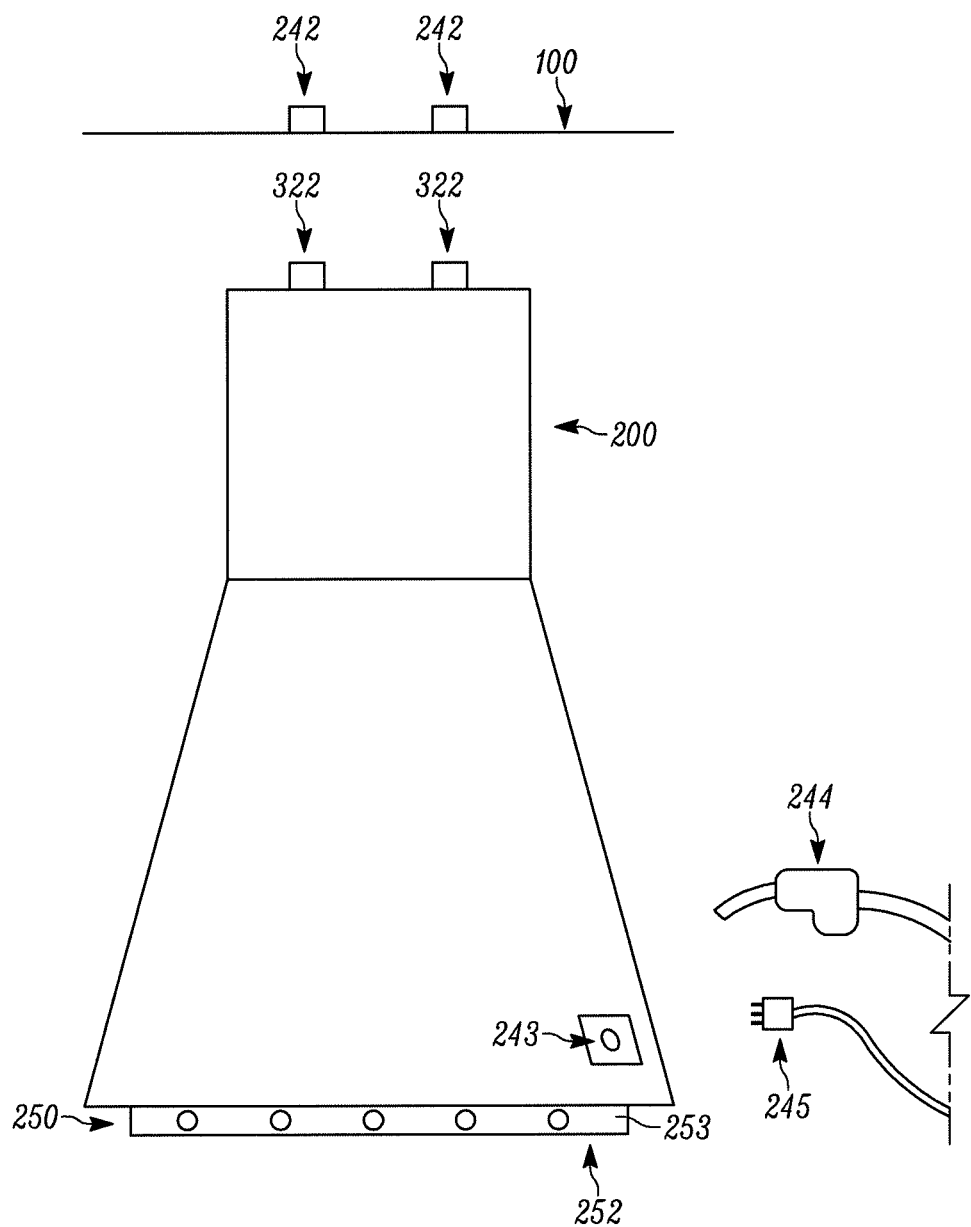
FIG. 7 shows an exemplary connection between an first unit and a second unit for a VTOL aircraft in accordance with embodiments of the present disclosure.

In the embodiments shown, the base, and particularly the male step portion 250 are substantially circular, with the male step portion comprising a bottom surface 252 and a sidewall 253, as shown, for example, with respect to FIG. 7.

In the embodiments described herein, the upper unit 100 and lower units 200 are made of a lightweight material having suitable strength to function as a VTOL aircraft. Examples of such materials are known and typically used in the industry, but future naturally occurring, manufactured and/or synthetic materials are still contemplated for use in this disclosure.

While in the embodiments described above, the exemplary passenger, cargo and rescue pods 200*a*, 200*b* and 200*c* are described as discrete and separate lower units 200, it is understood that a given lower unit 200 may serve a variety of functions. For example, a single lower unit 200 may carry both passengers and cargo. In other embodiments, a single pod 200 may be configured to carry passengers and provide rescue capability. Still further uses for lower units 200 are contemplated herein, including, but not limited to, materials transport, news, medical transport, and combinations of these and other uses.

In order for the upper unit 100 to utilize fuel and/or power which is stored in the lower unit 200, the upper unit 100 and lower unit 200 must be connected in a way which permits the fuel/power to flow from the lower unit 200 to the necessary components in the upper unit 100.

As described in further detail earlier, the upper unit 100 includes a limited capacity, and in some embodiments, isolated, power supply sufficient to power only the upper unit 100 for a short time (e.g., to transfer between lower units 200, power systems/components critical or necessary for flight, etc.). In order to travel a distance and/or transport a lower unit 200, the upper unit 100 relies on the fuel in the fuel cell 210 of the lower unit 200 to power at least the propellers and, in preferred embodiments, the additional components/systems required or otherwise traditionally used in flight (e.g., lights, navigation, autopilot, locks, etc.). In other words, the upper unit 100 and lower unit 200 must be releasably and interoperably connected.

Figure 16:
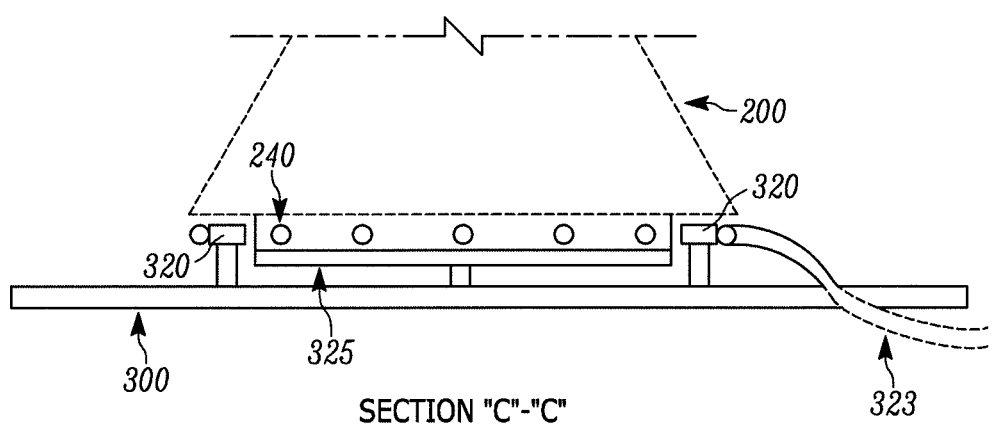

For example, in an embodiment, such as shown in FIG. 7, the lower unit 200 may include at least one, preferably two or more, quick connect features protruding from the top of the lower unit 200. The upper unit 100 may include an equal (or different) number of quick connect features 242 which correspond to one or more of the quick connect features 322 on the lower unit 200. The quick connect features 322, 242 include structures which facilitate the flow of power and/or fuel from the lower unit 200 to the upper unit 100. Such structures may include, for example, those described with reference to the receivers 240 and heads 320 of FIGS. 14A, 14B and 16, below. In other embodiments, such structures may include those commonly used in the art to establish a connection between removable components through which power and/or fuel is transferred.

In an embodiment, the quick connect features 322, 242 may automatically (with or without the assistance of power from the lower unit 200 and/or upper unit 100) make a secure interoperable connection. In other embodiment, the connection between the upper unit 100 and lower units 200 may be manually secured.

Not only do the lower unit 200 and upper unit 100 need to be connected in a way that facilitates fuel and/or power transfer between the lower unit 200 and upper unit 100 (e.g., releasably and interoperably connected), but also in a way which ensures the lower unit 200 will not disengage from the upper unit 100 while in the VTOL aircraft is in flight.

Figure 8:
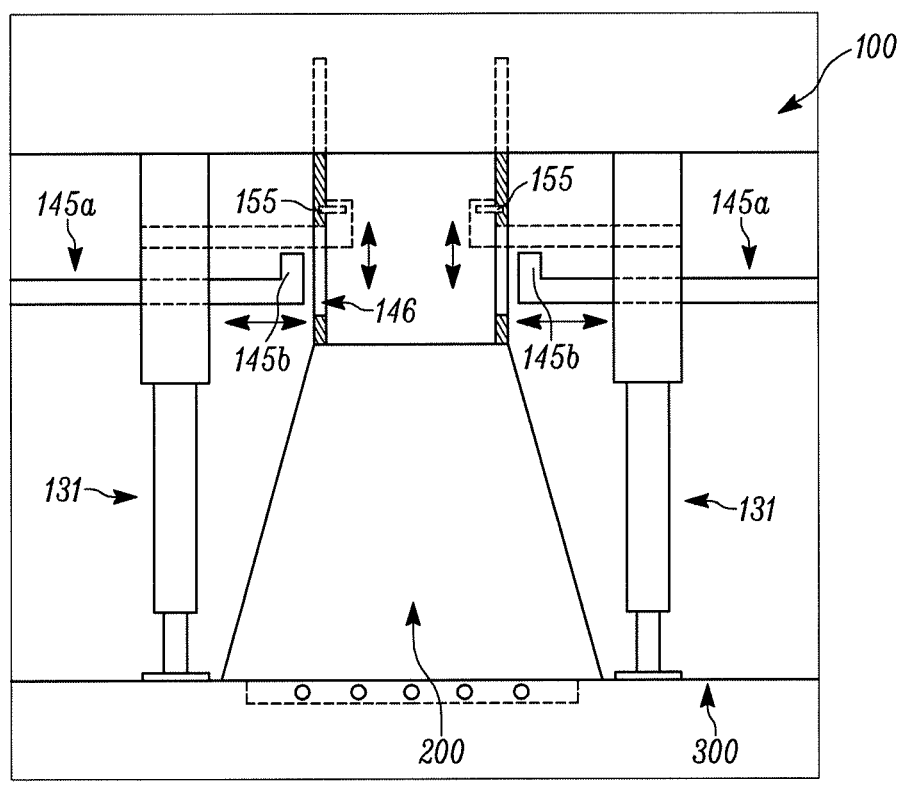
FIG. 8 is a schematic showing an exemplary locking attachment between an first unit and a second unit for a VTOL aircraft in accordance with embodiments of the present disclosure.

In an embodiment, it is preferably that the upper unit 100 includes a mechanism not reliant on electronic devices/power to attach to the lower unit 200. To that end, an exemplary locking system is shown in FIG. 8. In the exemplary embodiment shown, the upper unit 100 includes at least two legs 131. When at a landed position to engage a lower unit 200 as in FIG. 8, the locking mechanisms 145*a* of the legs 131 are disengaged from the lower unit 200. As the upper unit 100 moves upward, the legs 131 likewise move upward and the locking mechanisms 145*a* are forced horizontally towards the lower unit 200 (e.g., hydraulically or by other means) to enter a recess 146 on the upper portion of the lower unit 200 as indicated by the arrows in FIG. 8. As shown in FIG. 8, the locking mechanisms 145*a* each contain an ending flange 145*b*. The ending flange 145*b* projects upwards from the locking mechanism 145*a* to be adjacent the inside wall of the upper portion of the lower unit 200. In an embodiment, a locking pin 155 then engages the ending flange 145*b* to securing the locking mechanisms 145*a* in place. When the VTOL aircraft lands, the locking process is reversed. As the lower unit 200 "bottoms out" and the legs 131 start to bear weight, the locking mechanisms 145*a* are forced downward and outward, thereby disengaging the recess 146 and unlocking the upper unit 100 from the lower unit 200.

Figure 9A:
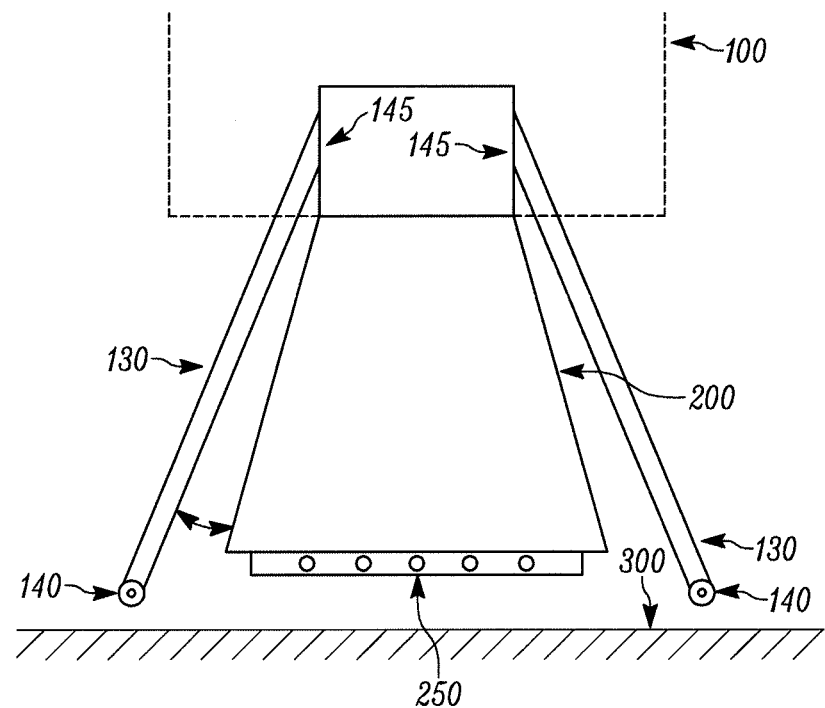
FIGS. 9A and 9B show an alternative locking attachment between an first unit and a second unit for a VTOL aircraft in accordance with embodiments of the present disclosure.
Figure 9B:
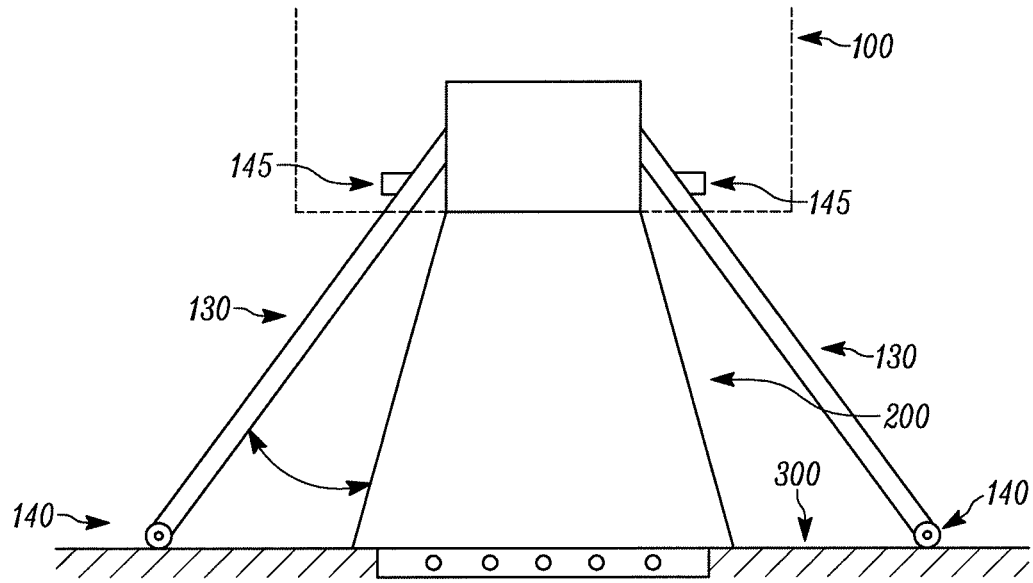

An alternative embodiment, such as, for example, shown with reference to FIGS. 9A and 9B, uses a similar principal as the locking mechanisms 145*a* described above. In this embodiment, however, the legs 130 are on roller balls 140 or similar devices permitting the legs 130 to roll the locking mechanisms 145 into position at takeoff. For example, as the upper unit 100 takes off, the legs 130 pivotally move towards the lower unit 200, causing the locking mechanisms 145 (see FIG. 9B) into position, as shown in FIG. 9A. The legs 130 would similarly roll away from the lower unit 200 as the VTOL aircraft lands, causing the locking mechanisms 145 to disengage the lower unit 200, as shown in FIG. 9B. As shown in FIGS. 9A and 9B, when the locking mechanisms 145 are engaged (e.g., legs 130 are not touching the ground), the angle between the legs 130 and the lower unit 200 is smaller (see FIG. 9A) than when the locking mechanisms 145 are disengaged (e.g., the bottom unit 200 "bottoms out" and the legs 130 bear weight) as in FIG. 9B.

In the embodiment shown in FIGS. 9A and 9B, hydraulics, or other similar device(s), may be used to hold the legs 130 in the unlocked position when transferring to another (e.g., waiting) lower unit 200. In a further embodiment, such as, for example, described with reference to FIG. 8, a locking pin, plate, or other structure may be used in place of hydraulics.

Figure 10:
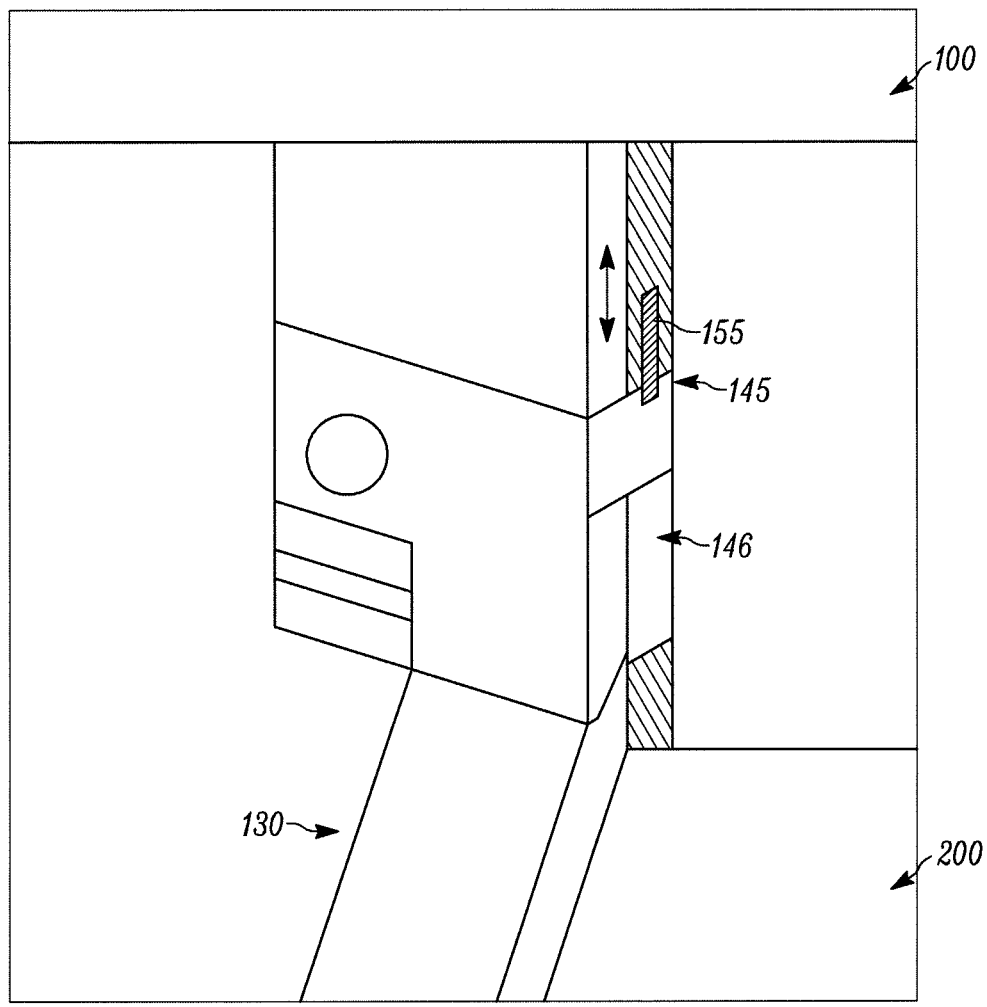
FIG. 10 shows the locking mechanisms described in FIGS. 9A-9B in further detail in accordance with embodiments of the present disclosure.

FIG. 10 shows an exemplary locking connection between an upper unit 100 and a lower unit 200 in further detail. As shown in FIG. 8, the legs 131 project downward from the upper unit 100 to be approximately perpendicular with the upper unit 100 (e.g., vertical when in standard operating position). FIG. 10, however, shows an alternative embodiment, such as with respect to FIGS. 9A and 9B, in which the legs 130 are angled downward from the upper unit 100. Shown in FIG. 10 are the upper unit 100, lower unit 200, and leg 130. The locking mechanism 145 is shown projecting into the void 146 of the lower unit 200. A locking pin 155 secures the upper unit's 200 legs 130 from movement during flight.

Figure 11A:
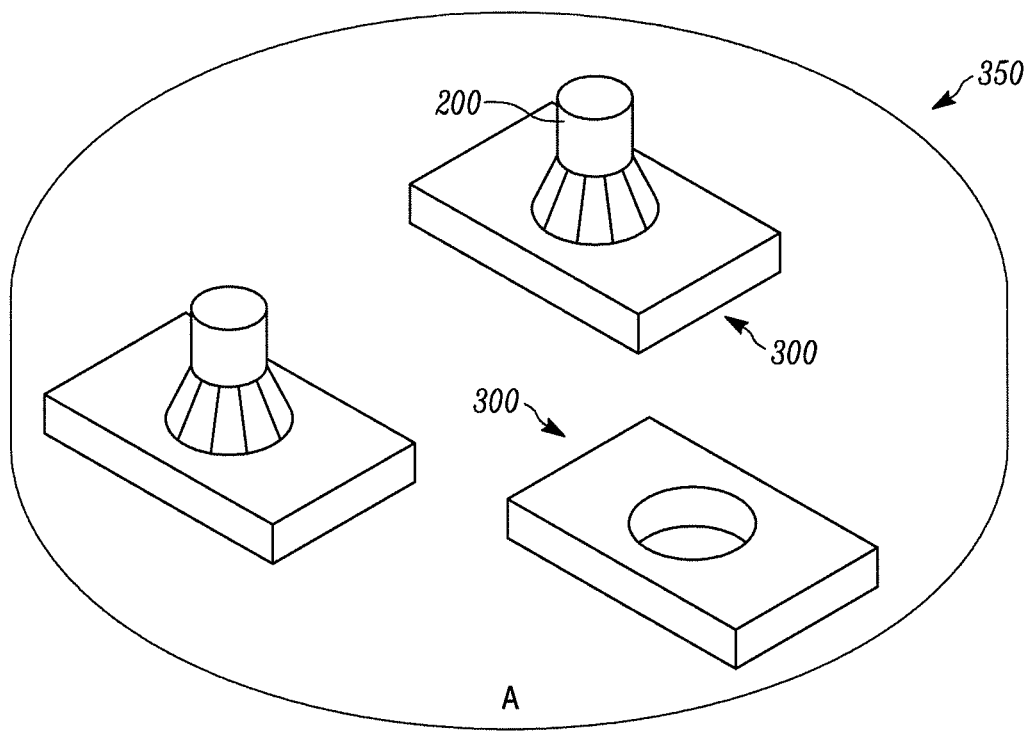
FIGS. 11A and 11B illustrate exemplary recharging/refueling pad arrangements for a VTOL aircraft system in accordance with embodiments of the present disclosure.
Figure 11B:
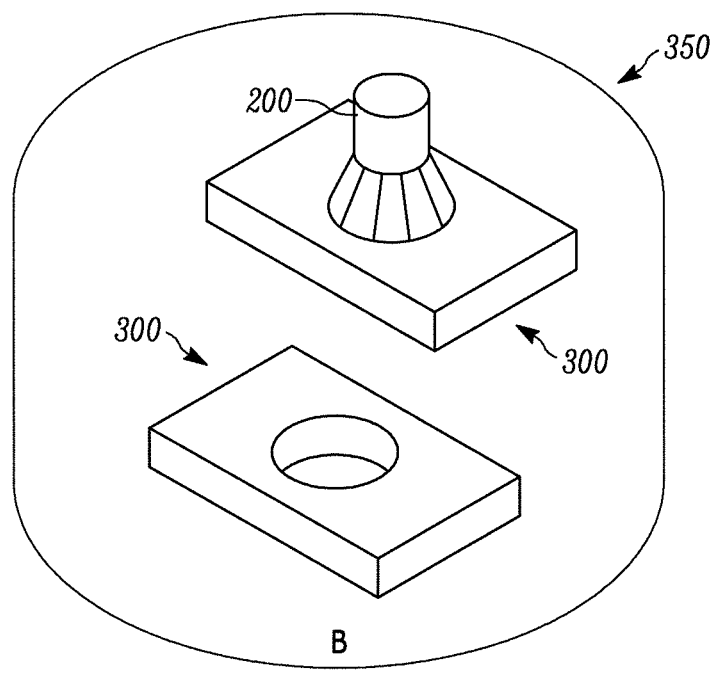

When the lower units 200 are being loaded/unloaded, or otherwise at rest, the lower units 200 will be stationed at a recharging/refueling pad 300. Exemplary recharging/refueling pad 300 system overviews are shown with reference to FIGS. 11A-13. In the exemplary embodiment shown in FIGS. 11A and 11B, the recharging/refueling pads 300 are shown at ground level 350. In FIG. 11A, there are three recharging/refueling pads 300, with only two occupied by lower units 200. In FIG. 11B there are two recharging/refueling pads 300, with only one occupied by a lower unit 200. By leaving one recharging/refueling pad 300 in a recharging/refueling pad system open, there is always a spot for an incoming VTOL aircraft to land and drop off a lower unit 200.

Figure 12:
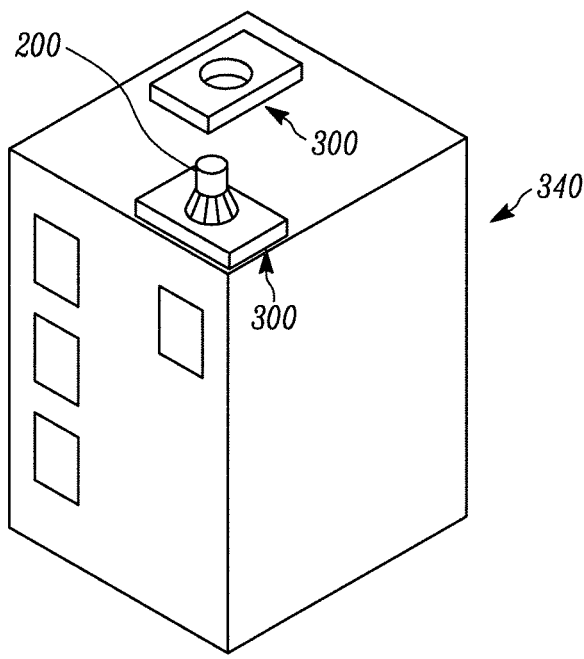
FIGS. 12 and 13 show exemplary VTOL aircraft systems in use in accordance with embodiments of the present disclosure.
Figure 13:
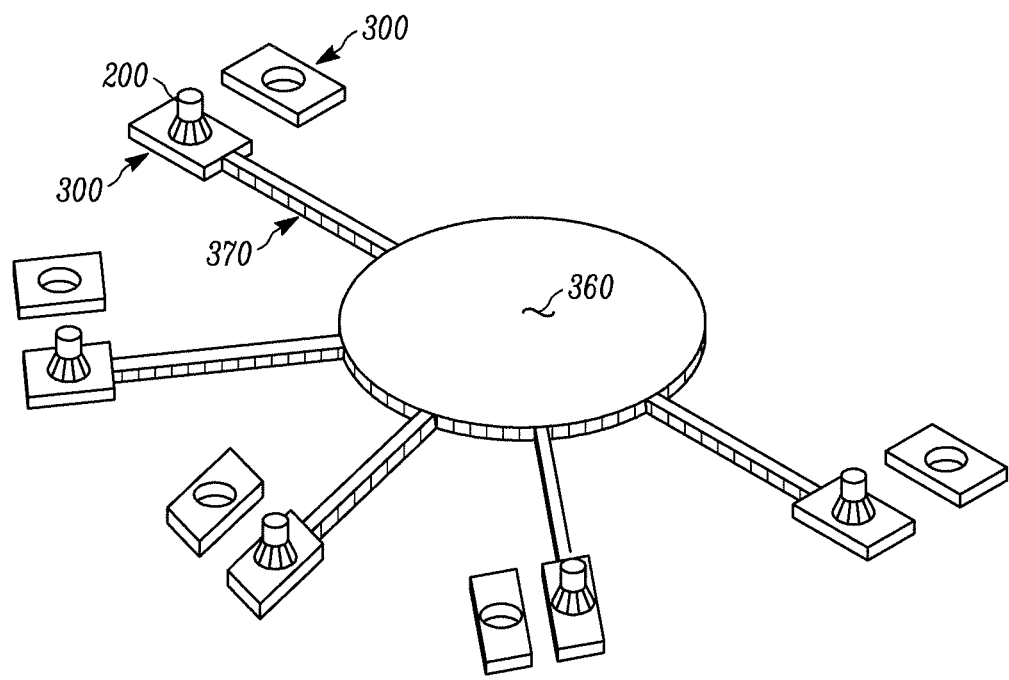

Although the embodiment in FIGS. 11A and 11B show the recharging/refueling pads 300 on the ground 350, it is understood that recharging/refueling pads 300 may be at any location where a VTOL aircraft may land with a lower unit 200, such as, for example, on the top of buildings 340 (much like helicopter pads) as shown in FIG. 12, and/or at traditional airports 360 with movable jet ways 370, as shown in FIG. 13.

As shown in FIGS. 14A-16 the recharging/refueling pads 300 have multiple recharging/refueling heads 320 which align with multiple receivers 240 on the male step portion 250 of the lower units 200.

Specifically, in the embodiments shown, the receivers 240 are positioned around the male step portion 250 on the sidewall 253 of the male step portion 250. In other words, the receivers 240 are circumferentially spaced about the sidewall 253 and open radially outwards from the sidewall 253 so as to receive a recharging/refueling head 320.

In an embodiment, the female recessed area 355 comprises a bottom surface 356 and a sidewall 357, corresponding to the bottom surface 252 and sidewall 253 of the male step portion 250, respectively.

The number of receivers 240 on the lower units 200 may depend on the size of the pod 200, the size of the fuel cell 210 (not shown), the speed/volume of charge/fuel which may be accepted by or otherwise pass through a receiver 240/head 320 connection (including, for example, the speed/volume of fuel versus the time permitted for recharging/refueling), and/or other such factors. In still further embodiments, the number of receivers 240 may be equal to or different than the number of heads 320 on a given recharging/refueling pad 300. In still further embodiments, at least a minimum number of receivers 240 may be positioned on/around the lower unit 200/male step portion 250 such that the minimum number of receivers 240 are at predetermined locations known to correspond to at least a minimum number of heads 320 on the recharging/refueling pads 300.

Figure 14A:
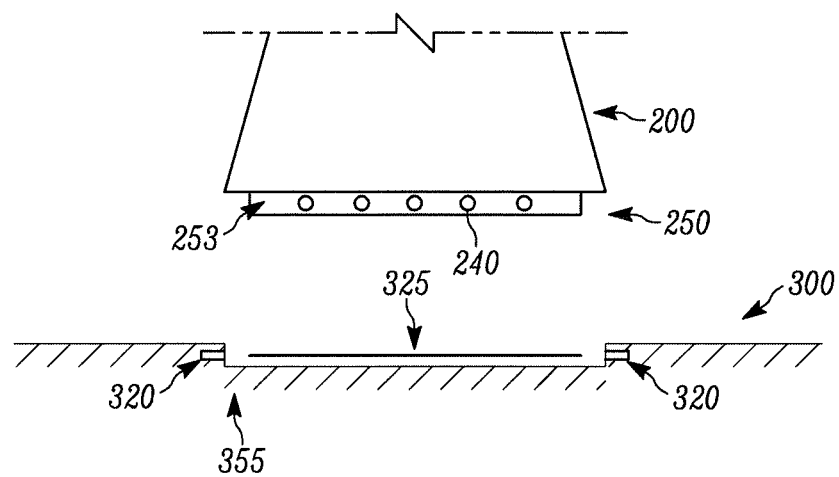
FIGS. 14A-14B illustrate an exemplary recharging/refueling pad in accordance with embodiments of the present disclosure.
Figure 14B:
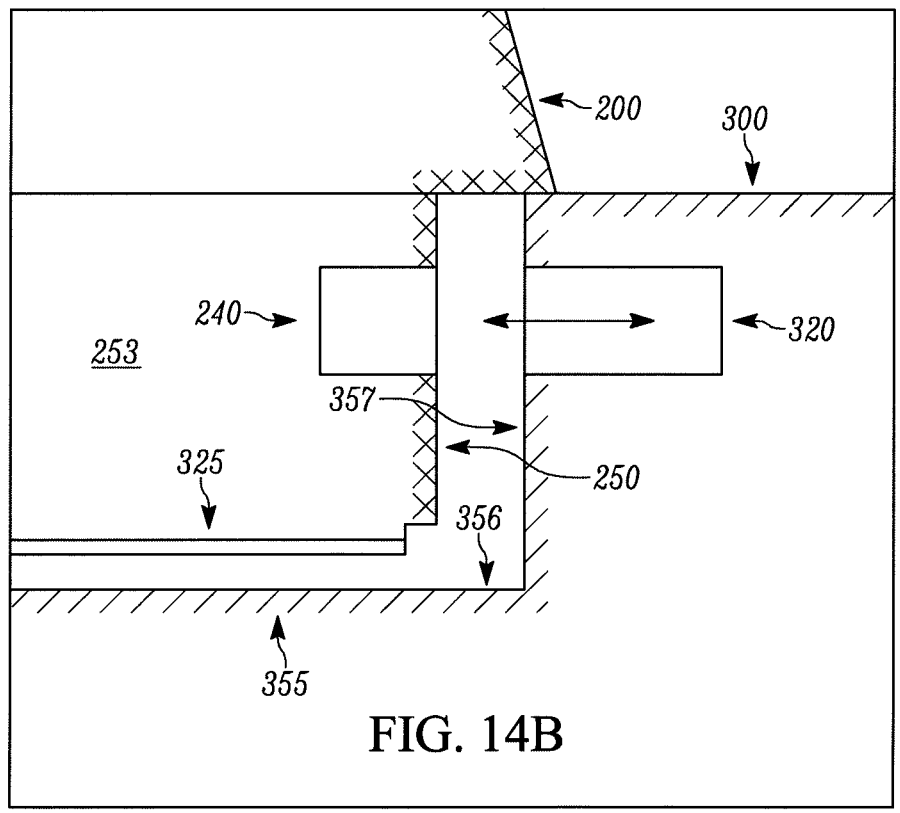
Figure 15:
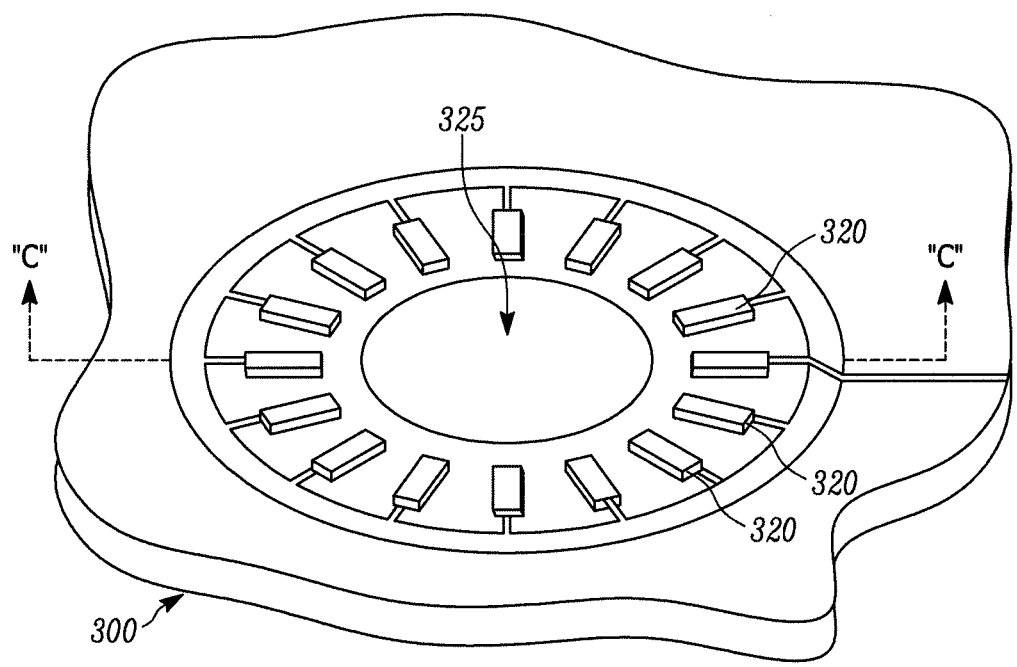
FIGS. 15 and 16 illustrate an alternative recharging/refueling pad in accordance with embodiments of the present disclosure.

As shown in FIGS. 14A and 14B, the pad 300 may include a female recessed area 355 such that the recharging/refueling heads 320 sit in the pad 300. As further shown in FIG. 16, the heads 320 may be raised above the level of the recharging/refueling pad 300, such that the female recessed area 355 is formed by the raised heads 320. In such embodiments, it is preferable for the recharging/refueling supply lines 323 to be below pad 300 level to leave room for the legs 130/131 (see FIGS. 8-9B).

In the embodiments shown, the female recessed area 355 is substantially circular, corresponding to the circular base and/or male step portion 250 of the lower unit 200. As illustrated in FIGS. 14A-16, the female recessed areas 355 are defined by a bottom surface 356 and a sidewall 357, as described above. The recharging/refueling heads 320 are positioned around the female recessed area 355 on the sidewall 357 of the female recessed area 355. In other words, the recharging/refueling heads 320 are circumferentially spaced about the sidewall 357 and configured to extend radially outwardly from the sidewall 357 towards a central point. In this configuration, the recharging/refueling heads 320 are positioned to correspond to recharging/refueling receivers 240 on the sidewall 253 of the male step portion 250 of a lower unit 200.

Figure 17A:
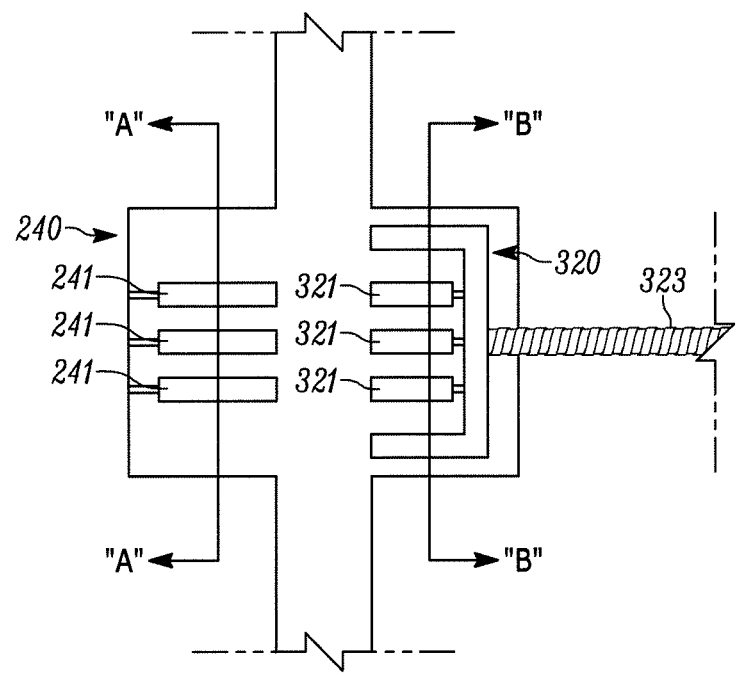
FIGS. 17A-17C show the connections between a recharging/refueling head on a recharging/refueling pad and a receiver on a second unit of a VTOL aircraft in further detail in accordance with embodiments of the present disclosure.
Figure 17B:
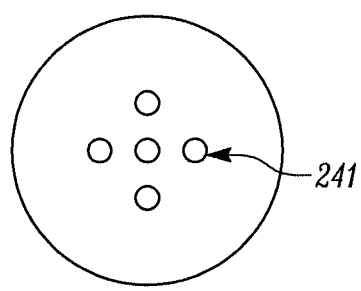
Figure 17C:
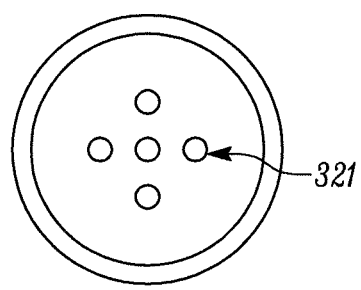

FIGS. 17A-17C show an exemplary connection between a recharging/refueling head 320 and a receiver 240 in further detail. In the embodiment shown, each receiver 240 includes one or more refuel/recharge quick connect connectors 241 for charge/fuel transfer. Similarly, each head 320 includes one or more refuel/recharge quick connect connectors 321. Preferably, the number of quick connect connectors 241, 321 of the lower unit 200 and pad 300, respectively, is the same.

While in the embodiments shown, the receivers 240 are shown on the sidewall 253 of lower male step portion 250 of the lower units 200, it is understood that the receivers 240, and therefore recharging/refueling heads 320, may be positioned differently on the lower units 200 and pads 300b (e.g., bottom of lower unit 200/top of pad 300; bottom surface 252 of male step portion 250/bottom surface 356 of female recessed area 335), such as, for example, shown in FIGS. 18A-18E.

As shown in FIGS. 18C and 18E, the pad 300 includes a plurality of recharging/refueling heads 320' in a vertical configuration on the bottom surface 356 of the female recessed area 335 with the heads 320' in weather protective structures 324'. As shown in FIG. 18A, the lower male step portion 250' of the lower unit 200' acts as a guide during landing. The lower male step portion 250' fits into the female recessed area 335' at the center of the pad 300', such as shown on FIGS. 18C and 18D.

FIG. 18E shows the connection between a head 320' and receiver 240' of the exemplary embodiment shown in FIG. 18A (e.g., vertical configuration). In the embodiment shown, the weather protective structure 324' includes a weather cover 322' which protects the recharging/refueling head 320' from the environment. In the embodiment shown, the weather protective structures 324' are shown as cone-shaped and further serve to assist with the alignment of the lower unit 200 on the recharging/refueling pad 300'. When a lower unit 200' engages the pad 300' such that a receiver 240' is positioned on top of, so as to mate with, the protective cone 324', the weather cover 322' opens to reveal the head(s) 320'.

While the embodiment shown in FIGS. 18B-18E includes recharging/refueling heads 320' protected by cone-like structures 324' with weather covers 322', it is understood that other structures and/or devices may be used to protect heads 320' when in a vertical configuration.

Although such a vertical configuration is contemplated, it is understood that positioning the receivers 240 around the sidewall 253 of the male step portion 250 of the lower unit 200 and around the sidewall 357 of the female recessed area 335, however, protects the recharging/refueling components, at least in part, from weather without the need for additional moving parts (e.g., weather covers).

While the embodiments above are described with respect to recharging/refueling pads 300, including, for example, a number of recharging/refueling heads 320/320' which correspond to recharging/refueling receivers 240/240' on the lower units 200/200', it is understood that lower units 200 may also include conventional recharging/refueling ports 243, such as shown in FIG. 7. Such conventional recharging/refueling ports 243 are capable of receiving standard recharging/refueling structures, such as, for example, a fuel pump 244 or charging plug 245. When using such conventional recharging/refueling methods, however, it is contemplated that recharging/refueling will take longer than with the pads 300 because the pads 300 are specifically designed to facilitate rapid recharging/refueling.

As shown in FIGS. 14A-16 and 18A-18E, in some embodiment, a turntable 325/325' may be provided at the bottom of the female pod-receiving area 335. These turntables 325/325' assist with multiple aspects of the VTOL aircraft disclosed herein. First, when an upper unit 100 is to pick up a lower unit 200/200', the turntable 325/325' helps align the lock mechanisms 145/145*a* of the upper unit 100 with the voids 146 in the lower units 200/200' (see, for example, FIGS. 8-10). Similarly, when a VTOL aircraft is landing, the turntable 325/325' helps align recharging/refueling heads 340/340' on the pad 300/300' with receivers 240/240' on the lower unit 200/200'.

In a further embodiment, the pads 300 are heated to prevent snow/ice build-up.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Among other things, it should be appreciated that the scope of the present disclosure is not limited to the number of constituting components, the materials thereof, the shapes thereof, the relative arrangement thereof, etc., as described above, but rather the above disclosures are simply provided as example embodiments.

Thus, it is specifically intended that the present invention not be limited to the embodiments and illustrations contained herein, but include modified forms of those embodiments including portions of the embodiments and combinations of elements of different embodiments as come within the scope of the following claims.

What is claimed is:

1. A vertical take-off and landing (VTOL) aircraft comprising:
 a first unit comprising a cockpit, at least one propeller, at least two landing legs and at least two locking mechanisms; and
 a second unit having a housing with base portion, an first unit engaging portion, and at least two lock mechanism-engaging structures, each corresponding to one of the at least two locking mechanisms of the first unit, the housing defining at least one interior cavity comprising at least one cargo area, a central passage providing access between the first unit and second unit, and a fuel cell configured around the central passage.

2. The VTOL aircraft of claim 1, wherein the base has a width greater than the first unit engaging portion and comprises a male step portion having a plurality of recharging/refueling receivers.

3. The VTOL aircraft of claim 2, wherein the first unit and second unit are releasably and interoperably connectable such that fuel from the fuel cell provides power to the propellers.

4. The VTOL aircraft of claim 1, comprising a plurality of propellers in a horizontal plane relative to the first unit when in standard operating position.

5. The VTOL aircraft of claim 1, wherein the at least one propeller is positioned with respect to the cockpit such that the cockpit has 360° visibility.

6. The VTOL aircraft of claim 1, wherein the fuel cell is selected from the group consisting of a fuel tank configured to hold liquid fuel, a rechargeable battery, and combinations thereof.

7. The VTOL aircraft of claim 1, wherein the first unit comprises an isolated power supply.

8. The VTOL aircraft of claim 1, wherein the cargo area is configured to transport passengers.

9. The VTOL aircraft of claim 1, wherein the cargo area is configured to transport articles.

10. The VTOL aircraft of claim 1, wherein the cargo area contains at least item selected from the group consisting of a sleeping quarter/bed, medical supplies, food rations, and combinations thereof.

11. The VTOL aircraft of claim 2, wherein the male step portion of the base of the second unit is circular.

12. The VTOL aircraft of claim 11, wherein the male step portion comprises a bottom surface and a sidewall.

13. The VTOL aircraft of claim 12, wherein the recharging/refueling receivers are circumferentially spaced radially outward of a center on the sidewall of the male step portion.

14. The VTOL aircraft of claim 12, wherein the recharging/refueling receivers are positioned on the bottom surface of the male step portion.

15. A vertical takeoff and landing aircraft system comprising:
 a first unit comprising a cockpit, a plurality of propellers configured around the cockpit, at least two landing legs and at least two locking mechanisms;
 at least two second units, each having a housing with base portion, a first unit engaging portion, and at least two lock mechanism-engaging structures, each corresponding to one of the at least two locking mechanisms of the first unit, the housing defining at least one interior cavity comprising at least one cargo area, a central passage providing access between the first unit and second unit, and a fuel cell configured around the central passage, wherein the base has a width greater than the first unit engaging portion and comprises a male step portion having a plurality of recharging/refueling receivers, wherein the first unit and second unit are releasably and interoperably connectable such that fuel from the fuel cell provides power to the propellers; and at least two recharging/refueling pads, each pad having a female recessed area corresponding to the male step portion of the second units, the female recessed area comprising a plurality of recharging/refueling heads, each corresponding to one of the plurality of recharging/refueling receivers on the male step portion of the second units.

16. The VTOL aircraft system of claim 15, wherein the male step portions of the bases of the second unit are circular and the female recessed areas of the recharging/refueling pads are circular.

17. The VTOL aircraft system of claim 16, wherein the male step portions each comprise a bottom surface and a sidewall and the female recessed areas each comprise a corresponding bottom surface and a corresponding sidewall.

18. The VTOL aircraft system of claim 17, wherein the recharging/refueling receivers are circumferentially spaced around the male step portions on the sidewalls of the male step portions.

19. The VTOL aircraft system of claim 18, wherein the recharging/refueling heads are circumferentially space around the female recessed areas on the sidewalls of the female recessed areas.

20. The VTOL aircraft system of claim 17, wherein the recharging/refueling receivers are positioned on the bottom surfaces of the male step portions.

21. The VTOL aircraft system of claim 20, wherein the recharging/refueling heads are positioned on the bottom surfaces of the female recessed areas.

22. The VTOL aircraft system of claim 21, wherein each of the recharging/refueling heads comprises a protective weather structure.

23. The VTOL aircraft system of claim 15, wherein the at least two recharging/refueling pads comprise a turntable at a bottom surface of the female recessed area.

* * * * *